(12) United States Patent
Carlson et al.

(10) Patent No.: US 7,710,687 B1
(45) Date of Patent: May 4, 2010

(54) HIGH CONDUCTIVITY GROUND PLANES FOR INTEGRATED LEAD SUSPENSIONS

(75) Inventors: Keith W. Carlson, Hutchinson, MN (US); Larry C. Webb, Jr., Hutchinson, MN (US); Valerie J. Webber, Buffalo Lake, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 823 days.

(21) Appl. No.: 11/531,468

(22) Filed: Sep. 13, 2006

(51) Int. Cl.
*G11B 5/48* (2006.01)

(52) U.S. Cl. .................................................. 360/244.3

(58) Field of Classification Search .............. 360/244.3, 360/244.9, 244.2, 244.8, 245.9, 245, 245.3
See application file for complete search history.

(56) References Cited

U.S. PATENT DOCUMENTS

| 5,608,591 A | 3/1997 | Klaassen |
| 5,651,723 A | 7/1997 | Bjornard et al. |
| 5,694,270 A | 12/1997 | Sone et al. |
| 5,737,152 A | 4/1998 | Balakrishnan |
| 5,796,552 A | 8/1998 | Akin, Jr. et al. |
| 5,812,344 A | 9/1998 | Balakrishnan |
| 5,857,257 A | 1/1999 | Inaba |
| 5,862,010 A | 1/1999 | Simmons et al. |
| 5,995,328 A | 11/1999 | Balakrishnan |
| 5,995,329 A | 11/1999 | Shiraishi et al. |
| 6,480,359 B1 | 11/2002 | Dunn et al. |
| 6,735,052 B2 | 5/2004 | Dunn et al. |
| 6,762,913 B1 | 7/2004 | Even et al. |
| 6,797,888 B2 | 9/2004 | Ookawa et al. |
| 6,831,314 B2* | 12/2004 | Higo et al. ................. 257/295 |
| 6,882,506 B2 | 4/2005 | Yamaoka et al. |
| 6,891,700 B2 | 5/2005 | Shiraishi et al. |
| 6,972,992 B1* | 12/2005 | Fukuzumi et al. ........... 365/173 |
| 7,084,447 B2* | 8/2006 | Fukuzumi et al. ........... 257/295 |
| 7,129,418 B2 | 10/2006 | Aonuma et al. |
| 7,142,395 B2 | 11/2006 | Swanson et al. |
| 7,158,348 B2 | 1/2007 | Erpelding |
| 7,161,767 B2 | 1/2007 | Hernandez et al. |
| 2004/0001372 A1* | 1/2004 | Higo et al. ................. 365/200 |
| 2004/0042129 A1* | 3/2004 | Mizuguchi et al. ........ 360/324.2 |
| 2005/0117257 A1 | 6/2005 | Thaveeprungsriporn et al. |
| 2006/0017082 A1* | 1/2006 | Fukuzumi et al. ........... 257/295 |
| 2006/0125034 A1* | 6/2006 | Ohba et al. ................. 257/421 |
| 2006/0187703 A1* | 8/2006 | Mizuguchi et al. .......... 365/158 |
| 2009/0027810 A1* | 1/2009 | Horng et al. ............. 360/324.2 |
| 2009/0096043 A1* | 4/2009 | Min et al. ................... 257/421 |

* cited by examiner

*Primary Examiner*—Allen T Cao
(74) *Attorney, Agent, or Firm*—Faegre & Benson LLP

(57) ABSTRACT

An integrated lead flexure or suspension including an insulating layer, a plurality of traces on the insulating layer and a stainless steel base layer on the side of the insulating layer opposite the traces. The traces are free of a conductive shield layer on the side opposite the insulating layer. One or more voids extend through the stainless steel layer below the traces. The voids are filled with a high conductivity metal layer.

8 Claims, 1 Drawing Sheet

HIGH CONDUCTIVITY GROUND PLANES FOR INTEGRATED LEAD SUSPENSIONS

FIELD OF THE INVENTION

The invention relates generally to integrated lead suspensions used in disk drives. In particular, the invention is a high conductivity ground plane structure for an integrated lead suspension.

BACKGROUND OF THE INVENTION

Integrated lead or wireless suspensions used to support the sliders and read/write heads in magnetic disk drives are well known and disclosed, for example, in the Akin, Jr. et al. U.S. Pat. No. 5,796,552 and the Shiraishi et al. U.S. Pat. No. 6,891,700. These devices typically include an integrated lead flexure mounted to a stainless steel load beam. The flexure typically includes a stainless steel base with a plurality of conductive leads or traces extending between terminal pads on the opposite ends (e.g., between the tail and slider-mounting region) of the device. A layer of polyimide or other insulating material separates the traces from the underlying stainless steel base. Subtractive and/or additive methods can be used to manufacture these devices. Subtractive manufacturing methods use photolithography and etching processes to form the flexure from laminated material stock having a layer of stainless steel and a layer of conductive material separated by an insulating layer. Additive manufacturing methods use photolithography, deposition and etching processes to add the insulating layer, traces and other structures to a stainless steel base.

The stainless steel layer of the flexure is often configured to act as an electrical ground plane for the traces. Because the insulating layer is usually relatively thin, the traces and ground plane can be coupled. These electrical characteristics can reduce the signal performance characteristics of the traces, especially at high signal frequencies. Approaches for compensating for the impact of the stainless steel layer on the signal performance characteristics are known. For example, the Shiraishi et al. U.S. Pat. No. 6,891,700 discloses a pattern of holes through the stainless steel layer of the flexure below the traces to lower parasitic capacitance. The Akin, Jr. et al. U.S. Pat. No. 5,796,552 discloses an embodiment having a shield formed by electro-deposition of a metallic film against the dielectric layer below the traces and a conductor shield over the traces.

There remains, however, a continuing need for integrated lead structures providing improved signal performance. To be commercially viable any such structures must be capable of being efficiently manufactured.

SUMMARY OF THE INVENTION

The present invention is an integrated lead flexure or suspension including an insulating layer, a plurality of traces on the insulating layer and a stainless steel base layer on the side of the insulating layer opposite the traces. The traces are free of a conductive shield layer on the side opposite the insulating layer. One or more voids extend through the stainless steel layer below the traces. A high conductivity material layer is in the voids. In one embodiment of the invention the high conductivity material layer is a plated metal layer.

DETAILED DESCRIPTION OF THE PREFERRED EMBODIMENTS

Figure 1:
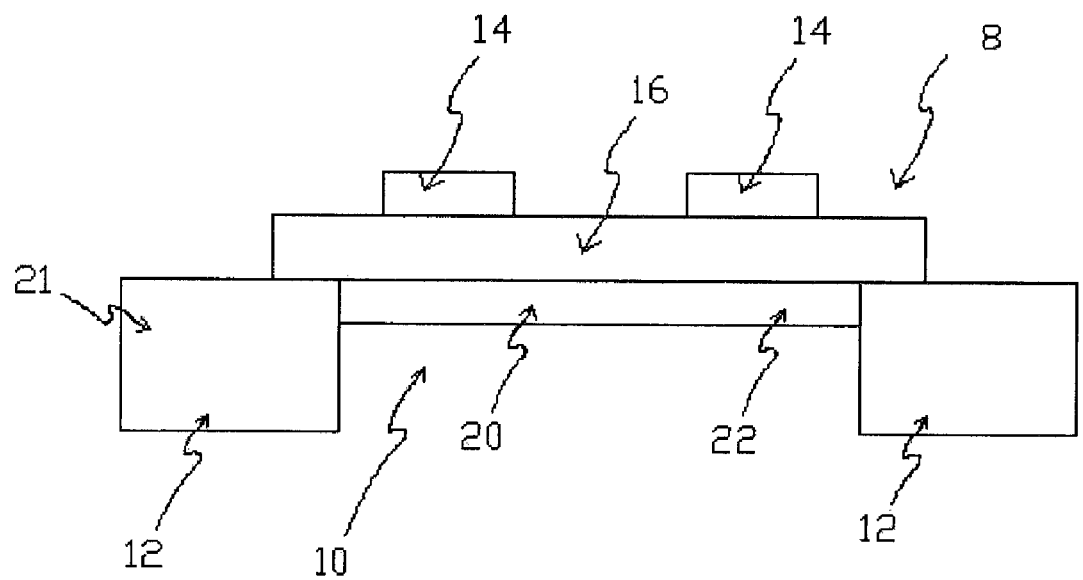
FIG. 1 is cross sectional view of a portion of an integrated lead flexure having a ground plane in accordance with one embodiment of the invention.

FIG. 1 is a cross sectional view of a portion of an integrated lead flexure 8 having a high conductivity ground plane structure 10 in accordance with one embodiment of the invention. As shown, flexure 8 includes a stainless steel base layer 12, a plurality of leads or traces 14 (two are shown for purposes of example only) and a dielectric or insulating layer 16 separating the traces from the base layer. With the exception of the ground plane structure 10 and its methods of manufacture described below, flexure 8 can be of any conventional or otherwise known structure and manufactured using any conventional or otherwise known additive, subtractive or other processes. Although the flexure 8 can have additional structures and layers (not shown) such as an insulating cover layer over the traces 14, flexure 8 is free from a conductive shield layer or other structure that is electrically insulated from and over the traces (i.e., over the side of the traces 14 opposite the insulating layer 16). Flexure 8 is configured to be welded or otherwise mounted to a load beam (not shown).

Ground plane structure 10 includes one or more voids 20 (only one is shown in FIG. 1) in the stainless steel base layer 12 below the traces 14, and a high conductivity layer 22 in the voids. Voids 20 extend through the base layer 12, exposing the side of insulating layer 16 opposite the traces 14. In the illustrated embodiment, void 20 is located between outer edge portions 21 of base layer 12. Voids 20 can extend for any desired length between the terminal pads (not shown) on the opposite ends of the traces, including on the gimbal region and tail of the flexure (not shown). In one embodiment the voids 20 extend for substantial lengths between a portion of the flexure 8 to be positioned adjacent to a spring region of the load beam and a gimbal region of the flexure, and along the flexure tail. Voids 20 can also extend along portions of flexure 8 where the traces 14 are located off the gimbal region of the flexure (not shown). The voids 20 are preferably not arranged as a plurality of windows in a regular, repeating pattern. Gaps in the voids 20 or other portions of base layer 12 will remain to allow the flexure 8 to be welded or otherwise attached to a load beam (not shown). Photolithography and wet etching processes can be used to form the voids 20 in the base layer 12.

High conductivity layer 22 can be a metal such as copper, gold, silver or aluminum, alloys of these or other metals, or other materials that have higher conductivities than that of the base layer 12. In other embodiments (not shown) the high conductivity layer 22 is a composite of several individual layers of metals such as those described above. In the illustrated embodiment the high conductivity layer 22 is located only within the void 20 (i.e., it does not extend over the surfaces of outer edge portions 22 opposite the insulating layer 16). High conductivity layer 22 has a thickness that is less than the thickness of the base layer 12 in the illustrated embodiment. In other embodiments (not shown) the high conductivity layer 22 has a thickness that is about the same thickness as that of the base layer 12. The thickness of the high conductivity layer 22 can be selected to achieve the desired electrical characteristics and other structural, manufacturing and other aspects of the flexure 8. Photolithography and deposition processes such as sputtering, vapor deposition, electroplating and electroless plating can be used to form the high conductivity layer 22. Other processes such as lamination or adhesive bonding can also be used.

Stainless steel is a relatively poor conductor. The poor conductivity characteristics of stainless steel limit characteristics such as frequency and pulse shape of signals transmitted over the traces of an integrated lead flexure. High conductivity layer 22 enhances the signal-transmission electrical characteristics of the traces 14. Furthermore, these enhanced characteristics can be achieved by efficient manufacturing processes.

Figure 2:
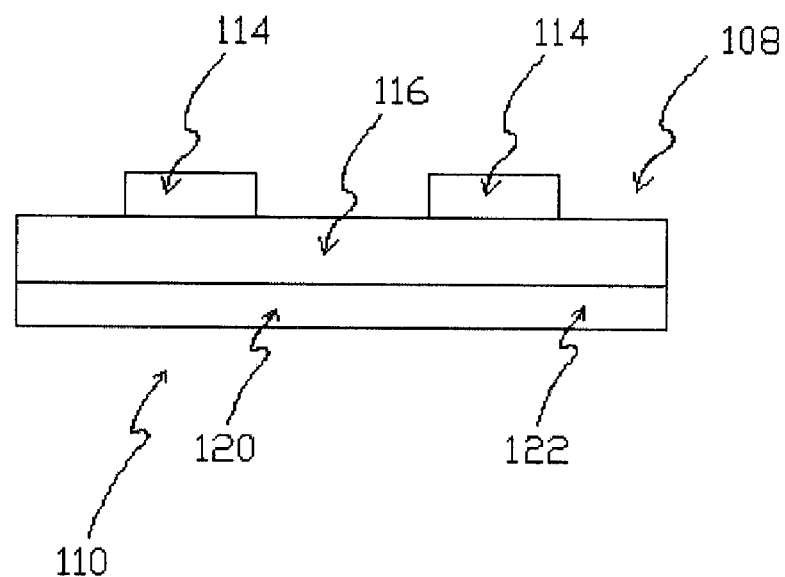
FIG. 2 is a cross sectional view of a portion of an integrated lead flexure having a ground plane in accordance with another embodiment of the invention.

FIG. 2 is a cross sectional view of a portion of an integrated lead flexure 108 having a high conductivity ground plane structure 110 in accordance with another embodiment of the invention. In the embodiment shown in FIG. 2, void 120 extends across the full width of flexure 108, and no edge portions of the stainless steel layer (not visible in FIG. 2) remain. With the exception of these differences, flexure 108 can be substantially the same or similar to flexure 8 described above in connection with FIG. 1, and similar reference numbers are used to identify similar features.

Although the present invention has been described with reference to preferred embodiments, those skilled in the art will recognize that changes can be made in form and detail without departing from the spirit and scope of the invention.

What is claimed is:

1. An integrated lead flexure or suspension, including:
an insulating layer;
a plurality of traces on the insulating layer, the traces free of a conductive shield layer on the side opposite the insulating layer;
a stainless steel base layer on the side of the insulating layer opposite the traces, including one or more voids below the traces extending through the base layer; and
a high conductivity material layer in the voids.

2. The integrated lead flexure or suspension of claim 1 wherein the high conductivity layer is a metal layer.

3. The integrated lead flexure or suspension of claim 2 wherein the high conductivity layer is a plated metal layer.

4. The integrated lead flexure or suspension of claim 3 wherein the high conductivity layer has a thickness that is less than the thickness of the stainless steel base layer.

5. The integrated lead flexure or suspension of claim 3 wherein at least some of the voids extend across a width of the stainless steel base layer.

6. The integrated lead flexure or suspension of claim 3 wherein the voids do not form a regular pattern along the length of the flexure or suspension.

7. The integrated lead flexure or suspension of claim 3 including a void that extends a substantial length between a spring region and a gimbal region of the flexure.

8. The integrated lead flexure of suspension of claim 3 including a void that extends a substantial length along a tail of the flexure.

* * * * *